(12) United States Patent
Hirose et al.

(10) Patent No.: US 11,430,980 B2
(45) Date of Patent: Aug. 30, 2022

(54) NEGATIVE ELECTRODE ACTIVE MATERIAL, MIXED NEGATIVE ELECTRODE ACTIVE MATERIAL, NEGATIVE ELECTRODE FOR NONAQUEOUS ELECTROLYTE SECONDARY BATTERY, LITHIUM ION SECONDARY BATTERY, PRODUCTION METHOD OF NEGATIVE ELECTRODE ACTIVE MATERIAL, AND PRODUCTION METHOD OF LITHIUM ION SECONDARY BATTERY

(71) Applicant: SHIN-ETSU CHEMICAL CO., LTD., Tokyo (JP)

(72) Inventors: Takakazu Hirose, Annaka (JP); Hiromichi Kamo, Takasaki (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 27 days.

(21) Appl. No.: 15/772,623

(22) PCT Filed: Oct. 31, 2016

(86) PCT No.: PCT/JP2016/004762
§ 371 (c)(1),
(2) Date: May 1, 2018

(87) PCT Pub. No.: WO2017/085908
PCT Pub. Date: May 26, 2017

(65) Prior Publication Data
US 2018/0323424 A1    Nov. 8, 2018

(30) Foreign Application Priority Data
Nov. 18, 2015  (JP) .............................. JP2015-225477

(51) Int. Cl.
*H01M 4/66* (2006.01)
*H01M 4/02* (2006.01)
(Continued)

(52) U.S. Cl.
CPC ............. *H01M 4/364* (2013.01); *C01B 33/32* (2013.01); *H01M 4/136* (2013.01); *H01M 4/36* (2013.01);
(Continued)

(58) Field of Classification Search
CPC .......... H01M 4/364; H01M 4/58; H01M 4/48; H01M 4/36; H01M 4/66; H01M 10/0525;
(Continued)

(56) References Cited

U.S. PATENT DOCUMENTS 5,395,711 A    3/1995  Tahara et al.
7,459,236 B2  12/2008  Konishiike et al.
(Continued)

FOREIGN PATENT DOCUMENTS

CN    104022257 A    9/2014
CN    104603993 A    5/2015
(Continued)

OTHER PUBLICATIONS

Jan. 10, 2017 International Search Report issued in Patent Application No. PCT/JP2016/004762.
(Continued)

*Primary Examiner* — Christian Roldan
(74) *Attorney, Agent, or Firm* — Oliff PLC

(57) ABSTRACT

A negative electrode active material comprising: particles of negative electrode active material, wherein the particles of negative electrode active material contain particles of silicon compound containing a silicon compound ($SiO_x$:0.5≤x≤1.6), and wherein the particles of silicon compound have, as chemical shift values obtained from a $^{29}$Si-MAS-NMR
(Continued)

spectrum, an intensity A of a peak derived from amorphous silicon obtained in −40 to −60 ppm, an intensity B of a peak derived from silicon dioxide obtained in the vicinity of −110 ppm, and an intensity C of a peak derived from Si obtained in the vicinity of −83 ppm, which satisfy the following formula 1 and formula 2.

$$B \leq 1.5 \times A \quad (1)$$

$$B < C \quad (2)$$

11 Claims, 3 Drawing Sheets

(51) Int. Cl.
*H01M 4/36* (2006.01)
*H01M 4/485* (2010.01)
*H01M 4/48* (2010.01)
*H01M 4/58* (2010.01)
*C01B 33/32* (2006.01)
*H01M 4/136* (2010.01)
*H01M 4/587* (2010.01)
*H01M 10/0525* (2010.01)
*H01M 10/058* (2010.01)

(52) U.S. Cl.
CPC ............... *H01M 4/48* (2013.01); *H01M 4/58* (2013.01); *H01M 4/587* (2013.01); *H01M 4/5825* (2013.01); *H01M 4/66* (2013.01); *H01M 4/661* (2013.01); *H01M 10/058* (2013.01); *H01M 10/0525* (2013.01); *C01P 2002/60* (2013.01); *C01P 2002/72* (2013.01); *C01P 2002/86* (2013.01); *C01P 2004/61* (2013.01); *C01P 2006/40* (2013.01); *H01M 2004/027* (2013.01)

(58) Field of Classification Search
CPC ........ H01M 4/587; H01M 4/62; H01M 4/485; H01M 4/362; H01M 4/131; C01B 33/32; C01B 33/113; C01P 2002/60; C01P 2006/40; C01P 2004/61; C01P 2002/86; C01P 2002/72
USPC .......................................................... 429/231
See application file for complete search history.

(56) References Cited

U.S. PATENT DOCUMENTS

| 8,377,592 | B2 | 2/2013 | Jeong et al. |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2014/0220347 | A1 | 8/2014 | Dehtiar et al. |
| 2014/0225030 | A1 | 8/2014 | Dehtiar et al. |
| 2014/0242469 | A1 | 8/2014 | Yamamoto et al. |
| 2015/0147658 | A1* | 5/2015 | Nakagaki ............... H01M 4/139 429/231.95 |
| 2015/0221950 | A1* | 8/2015 | Minami ................. H01M 4/366 429/223 |
| 2015/0303468 | A1 | 10/2015 | Kamo et al. |
| 2015/0380726 | A1 | 12/2015 | Nakanishi et al. |
| 2016/0233484 | A1 | 8/2016 | Hirose et al. |
| 2016/0254537 | A1 | 9/2016 | Kamo et al. |

FOREIGN PATENT DOCUMENTS

| CN | 105027334 | A | 11/2015 | |
| EP | 3062371 | A1 | 8/2016 | |
| JP | 2997741 | B2 | 1/2000 | |
| JP | 2001-185127 | A | 7/2001 | |
| JP | 2001-220125 | A | 8/2001 | |
| JP | 2002-042806 | A | 2/2002 | |
| JP | 2002-184411 | A | 6/2002 | |
| JP | 2006-114454 | A | 4/2006 | |
| JP | 2006-164954 | A | 6/2006 | |
| JP | 2007-234255 | A | 9/2007 | |
| JP | 2008-177346 | A | 7/2008 | |
| JP | 2008-251369 | A | 10/2008 | |
| JP | 2008-282819 | A | 11/2008 | |
| JP | 2009-070825 | A | 4/2009 | |
| JP | 2009-205950 | A | 9/2009 | |
| JP | 2009-212074 | A | 9/2009 | |
| JP | 2014-132529 | A | 7/2014 | |
| JP | 2014-164871 | A | 9/2014 | |
| JP | 2014-528893 | A | 10/2014 | |
| JP | 2015-207474 | A | 11/2015 | |
| WO | WO-2013054481 | A | * 4/2013 | ............ H01M 4/139 |
| WO | 2015/015795 | A1 | 2/2015 | |
| WO | 2015/025443 | A1 | 2/2015 | |
| WO | 2015/098024 | A1 | 7/2015 | |

OTHER PUBLICATIONS

Oct. 9, 2018 Office Action issued in Japanese Patent Application No. 2015-225477.
Jan. 20, 2020 Office Action issued in Taiwanese Patent Application No. 105136068.
May 14, 2019 Extended European Search Report in European Patent Application No. 16865912.6.
Jun. 30, 2020 Office Action issued in Chinese Patent Application No. 201680067715.6.
Jan. 27, 2021 Office Action issued in Chinese Patent Application No. 201680067715.6.
Nov. 13, 2020 Office Action issued in European Patent Application No. 16865912.6.
May 21, 2021 Office Action issued in Chinese Patent Application No. 201680067715.6.
Dec. 13, 2021 Office Action issued in Chinese Patent Application No. 201680067715.6.
Feb. 9, 2022 Office Action issued in Chinese Patent Application No. 201680067715.6.

* cited by examiner

[FIG. 1]
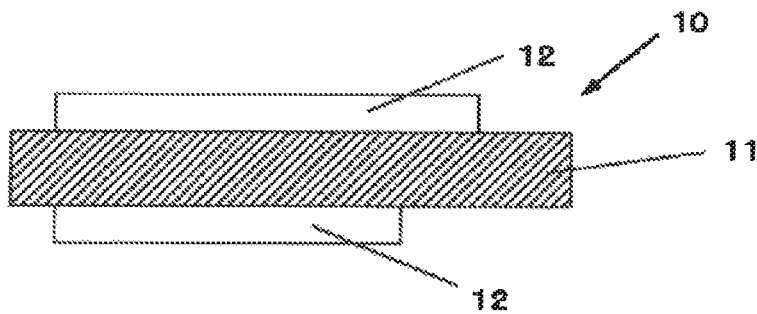
[FIG. 2]
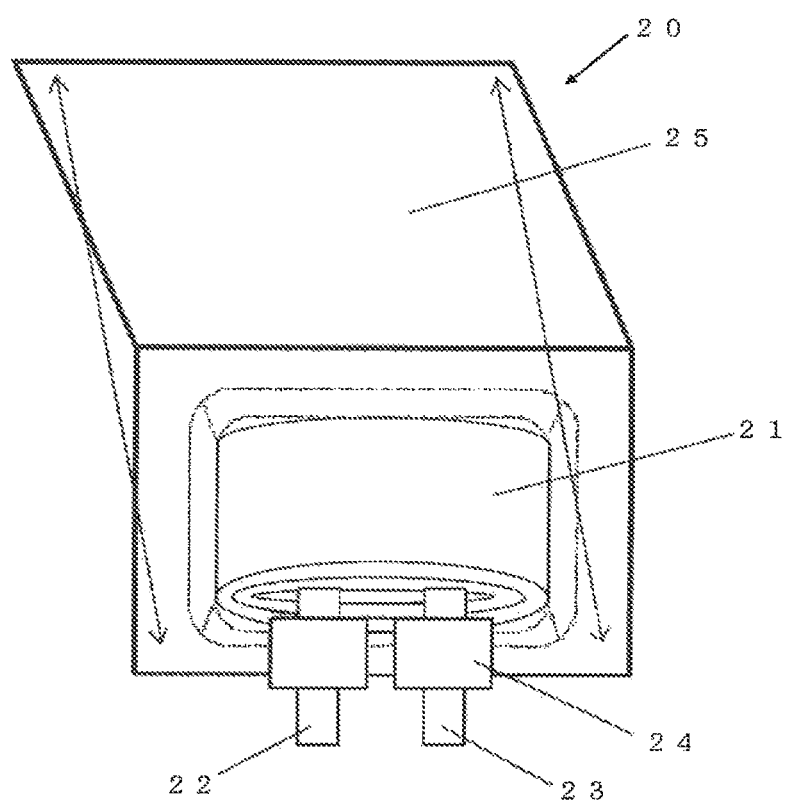
[FIG. 3]
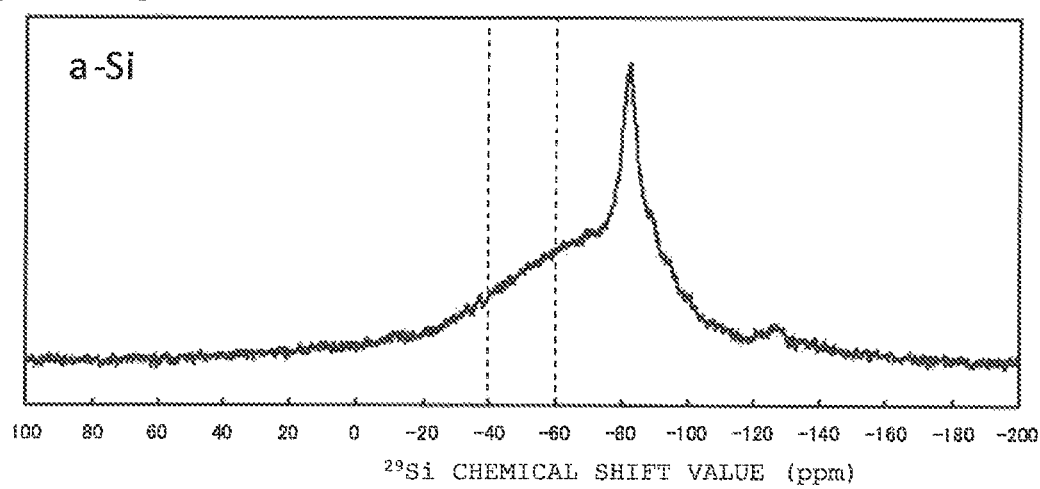

[FIG. 4]
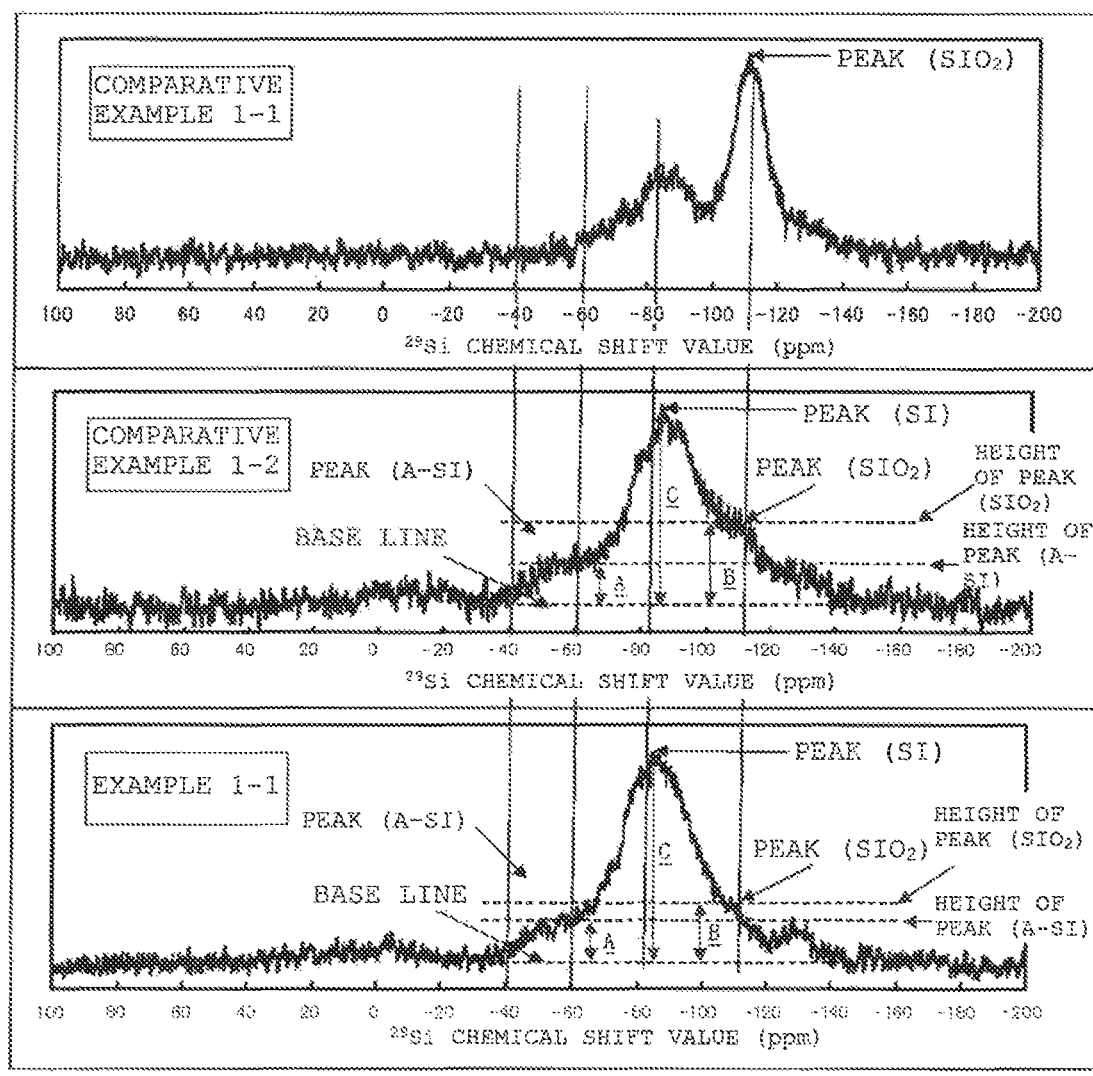

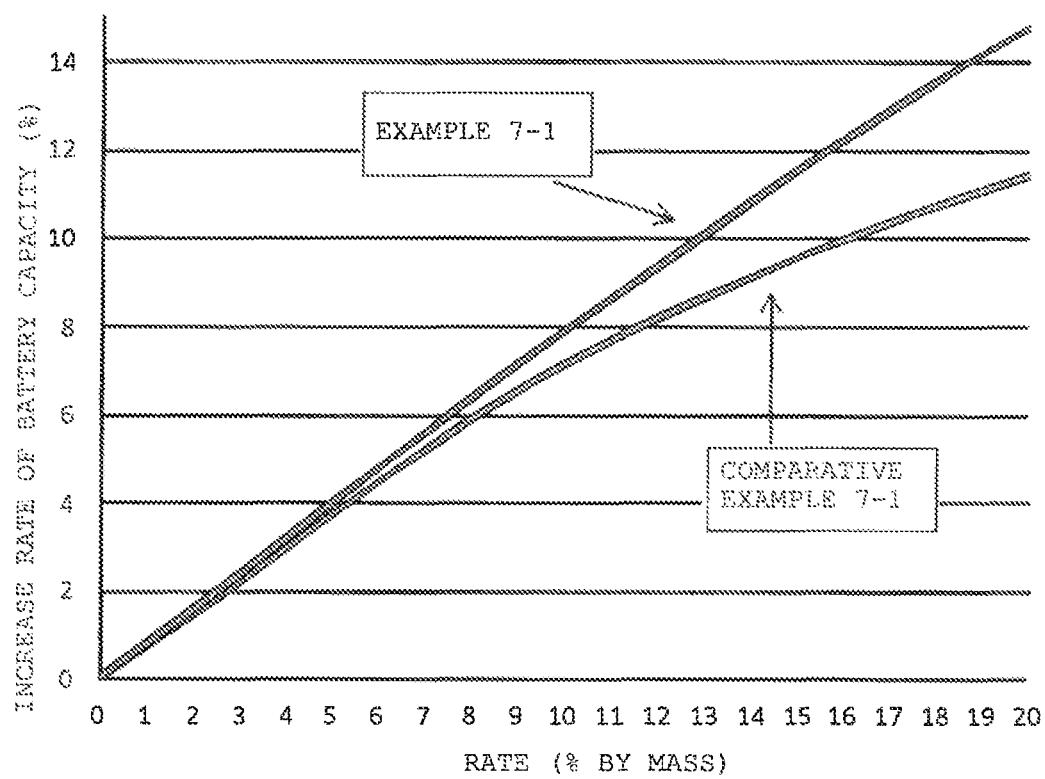
[FIG. 5]

NEGATIVE ELECTRODE ACTIVE MATERIAL, MIXED NEGATIVE ELECTRODE ACTIVE MATERIAL, NEGATIVE ELECTRODE FOR NONAQUEOUS ELECTROLYTE SECONDARY BATTERY, LITHIUM ION SECONDARY BATTERY, PRODUCTION METHOD OF NEGATIVE ELECTRODE ACTIVE MATERIAL, AND PRODUCTION METHOD OF LITHIUM ION SECONDARY BATTERY

TECHNICAL FIELD

The present disclosure relates to a negative electrode active material, a mixed negative electrode active material, a negative electrode for non-aqueous electrolyte secondary batteries, a lithium ion secondary battery, a production method of negative electrode active material, and a production method of lithium ion secondary battery.

BACKGROUND ART

In recent years, small-sized, electronic devices represented by mobile terminals and the like have been widely spread, and further down-sizing, lighter weight and longer life are strongly demanded. To a market demand like this, secondary batteries capable of obtaining, in particular, a smaller size, a lighter weight and a higher energy density have been forwarded. The secondary batteries have been studied to apply also to, without limiting to small-sized electronic devices, large-sized electronic devices represented by automobiles and power-storage systems represented by houses or the like.

Among these, a lithium ion secondary battery is highly expected because a smaller size and higher capacity are likely to be obtained and the energy density higher than that of a lead battery or a nickel-cadmium battery may be obtained.

The lithium ion secondary battery includes a positive electrode and a negative electrode, and an electrolytic solution together with a separator. The negative electrode includes a negative electrode active material related to a charge/discharge reaction.

As the negative electrode active material, while a carbon material is widely used, a further improvement in a battery capacity is demanded from recent market demand. In order to improve the battery capacity, it has been studied to use silicon as the negative electrode active material. This is because since silicon has a theoretical capacity (4199 mAh/g) of 10 times or more a theoretical capacity of graphite (372 mAh/g), a great improvement in the battery capacity is expected. A development of a silicon material as the negative electrode active material includes studies on not only a silicon simple substance but also compounds represented by alloys, oxides or the like. Furthermore, shapes of the active material have been studied, regarding the carbon material, from a standard coating type to an integrated type directly deposited on a current collector.

However, when the silicon is used as a main raw material as the negative electrode active material, since the negative electrode active material expands and contracts during charge/discharge, mainly the neighborhood of a superficial layer of the negative electrode active material tends to be broken. Furthermore, an ionic substance is generated inside the active material, and the negative electrode active material tends to be broken. When a superficial layer of the negative electrode active material is broken, a new surface is generated thereby, and a reaction area of the active material increases. At this time, since a decomposition reaction of an electrolytic solution occurs on the new surface and a film that is a decomposition product, of the electrolytic solution is formed, on the new surface, therefore the electrolytic solution is consumed. Therefore, the cycle characteristics tend to be degraded.

Until now, in order to improve an initial efficiency and the cycle characteristics of a battery, negative electrode materials for lithium ion secondary batteries having the silicon material as a main material and electrode configurations have been variously studied.

Specifically, in order to obtain excellent, cycle characteristics and high safety, silicon and amorphous silicon dioxide are simultaneously deposited by using a gas phase method (see, for example, Patent Literature 1 below). Furthermore, in order to obtain high battery capacity and safety, a carbon material (an electron conducting material) is provided, on a superficial layer of particles of silicon oxide (see, for example, Patent Literature 2 below). Furthermore, in order to improve the cycle characteristics and to obtain high input/output characteristics, an active material containing silicon and oxygen is prepared and an active material layer having a high oxygen ratio in the neighborhood of a current collector is formed (see, for example, Patent Literature 3 below). Still further more, in order to improve the cycle characteristics, oxygen is contained in a silicon active material such that an average oxygen content is 40 at. % or less, and an oxygen content is high in a place close to a current collector (see, for example, Patent Literature 4 below).

Furthermore, in order to improve a first time charge/discharge efficiency, a nano composite containing a Si phase, $SiO_2$ and a $M_yO$ metal oxide is used (see, for example, Patent Literature 5, below). Still furthermore, in order to improve the cycle characteristics, $SiO_x$ ($0.8 \leq x \leq 1.5$, a particle size range=1 μm to 50 μm) and a carbon material are mixed and sintered at a high temperature (see, for example, Patent Literature 6, below). Furthermore, in order to improve the cycle characteristics, an active material is controlled such that a mole ratio of oxygen to silicon in a negative electrode active material is set to from 0.1 to 1.2, and, in the neighborhood of an interface of the active material and a current collector, a difference of a maximum value and a minimum value of the molar ratios is in the range of 0.4 or less (see, for example, Patent Literature 7, below). Still furthermore, in order to improve battery load characteristics, a metal oxide containing lithium is used (see, for example, Patent Literature 8, below). Furthermore, in order to improve the cycle characteristics, a hydrophobic layer such as a silane compound is formed on a superficial layer of a silicon material (see, for example, Patent Literature 9, below). Still furthermore, in order to improve the cycle characteristics, a silicon oxide is used, and a graphite film is formed on a superficial layer thereof to impart electric conductivity (see, for example, Patent Literature 10, below). In the Patent Literature 10, regarding a shift value obtained from a Raman spectrum of the graphite film, broad peaks appear at 1330 $cm^{-1}$ and 1580 $cm^{-1}$, and an intensity ratio thereof $I_{1330}/I_{1580}$ is $1.5 < I_{1330}/I_{1580} < 3$. Furthermore, in order to improve high battery capacity and cycle characteristics, particles having a silicon crystallite phase dispersed in silicon dioxide are used (see, for example, Patent Literature 11, below). Still furthermore, in order to improve overcharge and overdischarge characteristics, silicon oxide in which an atomic ratio of silicon and oxygen is controlled to 1:y (0<y<2) is used (see, for example, Patent Literature 12, below).

CITATION LIST

Patent Literature

Patent Literature 1: JP 2001-185127 A
Patent Literature 2: JP 2002-042806 A
Patent Literature 3: JP 2006-164954 A
Patent Literature 4: JP 2006-114454 A
Patent Literature 5: JP 2009-070825 A
Patent Literature 6: JP 2008-282819 A
Patent Literature 7: JP 2008-251369 A
Patent Literature 8: JP 2008-177346 A
Patent Literature 9: JP 2007-234255 A
Patent Literature 10: JP 2009-212074 A
Patent Literature 11: JP 2009-205950 A
Patent Literature 12: JP 2997741 B1

SUMMARY OF INVENTION

Technical Problem

As was described above, in recent years, higher performance and multi-functionalization of small-sized mobile devices typical in the electronic devices have been forwarded, and a lithium ion secondary battery that is a main power source thereof is required to have an increased battery capacity. As one measure to solve the problem, it is desired to develop a lithium ion secondary battery formed of a negative electrode that uses a silicon-based active material as a main material. Furthermore, the lithium ion secondary battery that uses the silicon-based active material is desired to have the first time efficiency and cycle characteristics close to equal with those of a lithium ion secondary battery that uses a carbon-based active material. However, a negative electrode active material that shows the same first time efficiency and cycle stability as those in the lithium ion secondary battery that uses a carbon-based active material has not been proposed.

The present invention was performed in view of the above problems, and it is intended to provide a negative electrode active material, a mixed negative electrode active material containing the negative electrode active material, a negative electrode for nonaqueous electrolyte secondary batteries containing the mixed negative electrode active material, and a lithium ion secondary battery, which are capable of increasing a battery capacity and improving the cycle characteristics and the initial charge/discharge characteristics when used as the negative electrode active material of a lithium ion secondary battery.

Furthermore, the present disclosure intends to provide a production method of a negative electrode active material having excellent battery characteristics such as described above and a production method of lithium ion secondary batteries.

Solution to Problem

In order to achieve the above object, the present-disclosure is a negative electrode active material comprising particles of negative electrode active material, the particles of negative electrode active material contain particles of silicon compound containing a silicon compound (SiO$_x$: 0.5≤x≤6), the particles of silicon compound have, as chemical shift values obtained from a $^{29}$Si-MAS-NMR spectrum, an intensity A of a peak derived from amorphous silicon (also described as a-Si) obtained in −40 to −60 ppm, an intensity B of a peak derived from silicon dioxide obtained in the vicinity of −110 ppm, and an intensity C of a peak derived from Si obtained in the vicinity of −83 ppm, which satisfy the following formula 1 and formula 2.

$$B \leq 1.5 \times A \quad (1)$$

$$B < C \quad (2)$$

Thus, when satisfying the formula (1), that is, when, a silicon dioxide component is sufficiently small relative to an amorphous silicon component, during charge of a battery, a negative electrode active material having a high battery initial efficiency is formed because an irreversible component generated due to a reaction of a part of silicon dioxide with lithium may be sufficiently-reduced. In addition to this, when satisfying the formula 2, that, is, when the silicon dioxide component is sufficiently small relative to a silicon component, in the same manner as the above, a negative electrode active material having higher battery initial efficiency is formed because the irreversible component generated during charge of the battery may be more reduced. Therefore, the negative electrode active material of the present disclosure has a large battery capacity and may improve the initial efficiency and the cycle characteristics.

At this time, the particles of negative electrode active material preferably contain at least one kind or more of Li$_2$SiO$_3$ and Li$_4$SiO$_4$.

Since the negative electrode active material like this is obtained by modifying, in advance, a SiO$_2$ component part that becomes unstable during insertion/release of lithium during charge/discharge of the battery in the silicon compound to a relatively stable lithium silicate, the irreversible capacitance generated during charge may be reduced.

Furthermore, the chemical shift value obtained from the $^{29}$Si-MAS-NMR spectrum preferably has a peak in the vicinity of −130 ppm.

The peak of which chemical shift value appears in the vicinity of −130 ppm is also considered derived from amorphous silicon. Therefore, since a ratio of the amorphous silicon component is larger, the initial efficiency and cycle characteristics may be more improved.

Furthermore, the particles of silicon compound preferably have a half value width (2θ) of a diffraction peak derived from a Si (111) crystal plane obtained by X-ray diffractometry of 1.2° or more and a crystallite size corresponding to the crystal plane of 7.5 nm or less.

When the negative electrode active material in which the particles of silicon compound have the silicon crystallinity is used as the negative electrode active material of a lithium ion secondary battery, more excellent cycle characteristics and initial charge/discharge characteristics may be obtained.

Furthermore, when a test cell formed of a negative electrode containing a mixture of the negative electrode active material and a carbon-based active material and a counter electrode lithium is prepared, in the test cell, charge/discharge formed of charge during which a current is flowed so as to insert lithium into the negative electrode active material and discharge during which the current is flowed so as to detach lithium from the negative electrode active material is carried out 30 times, and when a graph showing a relationship between a differential value dQ/dV obtained by differentiating a discharge capacity Q by a potential V of the negative electrode based on the counter electrode lithium and the potential V is depicted in each charge/discharge, the potential V of the negative electrode during discharges on or after X times (1≤X≤30) preferably has a peak in the range of from 0.40 V to 0.55 V.

Since the above peak in the V-dQ/dV curve is similar to the peak of the silicon material and has a sharp rise of a discharge curve on a higher potential side, when a battery is designed, a capacity is easily developed. Furthermore, when the peak is developed during the charge/discharge within 30 times, the negative electrode active material in which a stable bulk is formed is obtained.

Furthermore, a median diameter of the particles of negative electrode active material is preferably 1.0 μm or more and 15 μm or less.

When the median diameter is 1.0 μm or more, an increase of the battery irreversible capacity may be suppressed from increasing due to an increase in a surface area a mass. On the other hand, by setting the median diameter to 15 μm or less, the particles become difficult to be cracked and a new surface is difficult to be developed.

Furthermore, the particles of negative electrode active material preferably contain a carbon material on a superficial part.

Like this, when the particles of negative electrode active material contain the carbon material on the superficial part thereof, the electric conductivity may be improved.

Furthermore, an average thickness of the carbon material is preferably 10 nm or more and 5000 nm or less.

When the average thickness of the carbon material is 10 nm or more and 5000 nm or less, the electric conductivity may be improved. Furthermore, when an average thickness of the carbon material to be coated is 5000 nm or less, by using the negative electrode active material containing the particles of negative electrode active material like this in a lithium ion secondary battery, the battery capacitance may be suppressed from degrading because the particles of silicon compound may be sufficiently secured.

A mixed negative electrode active material characterized by containing the negative electrode active material and a carbon-based active material is provided.

Thus, when the carbon-based active material is contained together with the negative electrode active material (silicon-based negative electrode active material) of the present disclosure as a material forming a negative electrode active material layer, the electric conductivity of the negative electrode active material layer may be improved and an expansion stress accompanying the charge may be alleviated. Furthermore, by mixing the silicon-based negative electrode active material with the carbon-based active material, the battery capacity may be improved.

Furthermore, in order to achieve the object, the present disclosure provides a negative electrode for nonaqueous electrolyte secondary batteries, characterized by containing the mixed negative electrode active material and by having a ratio of a mass of the negative electrode active material relative to a total mass of the negative electrode active material and the carbon-based active material of 6% by mass or more.

When the ratio of mass of the negative electrode active material (silicon-based negative electrode active material) relative to a total amount of masses of the negative electrode active material (silicon-based negative electrode active material) and the carbon-based active material is 6% by mass or more, the battery capacity may be further improved.

Furthermore, in order to achieve the object, the present disclosure provides a negative electrode for nonaqueous electrolyte secondary batteries, characterized by having a negative electrode active material layer formed with the mixed negative electrode active material and a negative electrode current collector, having the negative electrode active material layer formed on the negative electrode current collector, containing carbon and sulfur in the negative electrode current collector, and having a content, of each thereof of 70 mass ppm or less.

Thus, when the negative electrode current collector constituting the negative electrode contains the carbon and sulfur in the amount described above, the negative electrode may be suppressed from being deformed during the charge.

Furthermore, in order to achieve the object, the present disclosure provides a lithium ion secondary battery characterized by using negative electrode containing the negative electrode active material.

When the lithium ion secondary battery uses the negative electrode containing the negative electrode active material like this, high, capacity, excellent cycle characteristics and initial charge/discharge characteristics are obtained.

Furthermore, in order to achieve the object, the present disclosure is a method of producing a negative electrode active material containing particles of negative electrode active material containing particles of silicon compound, the method including preparing particles of negative electrode active material containing particles of silicon compound containing a silicon compound ($SiO_x$:0.5≤x≤1.6), and selecting from the particles of negative electrode active material, particles of negative electrode active material in which, as chemical shift values obtained from a $^{29}Si$-MAS-NMR spectrum, an intensity A of a peak derived from amorphous silicon obtained in −4.0 to −60 ppm, an intensity B of a peak derived from a silicon dioxide region obtained in the vicinity of −110 ppm, and an intensity C of a peak derived from Si obtained in the vicinity of −83 ppm satisfy the following formula 1 and formula 2, wherein producing the negative electrode active material with the selected particles of negative electrode active material.

$$B \leq 1.5 \times A \qquad (1)$$

$$B < C \qquad (2)$$

When the negative electrode active material is produced by selecting thus the particles of silicon-based active material, the negative electrode active material having high capacity, excellent cycle characteristics and initial charge/discharge characteristics when used as the negative electrode active material of the lithium ion secondary battery may be produced.

Furthermore, in order to achieve the object, the present disclosure provides a production method of a lithium ion secondary battery, characterized by preparing a negative electrode using the negative electrode active material produced according to the production method of the negative electrode active material, and by producing a lithium ion secondary battery with the prepared negative electrode.

By using the negative electrode active material produced as described above, a lithium ion secondary-battery having high capacity, excellent cycle characteristics and initial charge/discharge characteristics may be produced.

Advantageous Effects of Invention

The negative electrode active material of the present disclosure may obtain high capacity and excellent cycle characteristics and initial charge/discharge characteristics when used as the negative electrode active material of secondary batteries. Furthermore, similar effect may be obtained also in the mixed negative electrode active material, the negative electrode, and the lithium ion secondary battery, which contain the negative electrode active material. Furthermore, according to the production method of negative electrode active material of the present disclosure, when used as the negative electrode active material of the secondary battery, a negative electrode active material having excellent cycle characteristics and initial charge/discharge characteristics may be produced.

BRIEF DESCRIPTION OF DRAWINGS

FIG. 1 is a cross-sectional diagram showing a structure of a negative electrode for lithium ion secondary batteries of the present disclosure;

FIG. 2 is a diagram showing a configuration example (laminate film type) of the lithium ion secondary battery of the present disclosure;

FIG. 3 is one example of a spectrum obtained when $SiO_x$ containing amorphous silicon was measured using $^{29}$Si-MAS-NMR;

FIG. 4 shows $^{29}$Si-MAS-NMR spectra measured in Example 1-1, Comparative Example 1-1 and Comparative Example 1-2; and FIG. 5 is a graph showing increase rates of battery capacity in Example 7-1 and Comparative Example 7-2.

DESCRIPTION OF EMBODIMENTS

In what follows, an embodiment of the present disclosure will be described. However, the present disclosure is not limited thereto.

As was described above, as one of methods for increasing the battery capacity of the lithium ion secondary battery, it has been studied to use the negative electrode that uses the silicon-based active material as a main material. The lithium ion secondary battery that uses the silicon-based active material is desired to have the initial charge/discharge characteristics and cycle characteristics close to the same as the lithium ion secondary battery that uses the carbon-based active material. However, a silicon-based active material that shows the initial efficiency and cycle stability equivalent with the lithium ion secondary battery that uses the carbon-based active material has not been proposed.

There, the present inventors have conducted intensive studies to obtain a negative electrode active material that has high battery capacity, and excellent cycle characteristics and initial efficiency, when used in a secondary battery, and came to the present disclosure.

The negative electrode active material of the present disclosure contains particles of negative electrode active material. The particles of negative electrode active material contain particles of silicon compound containing a silicon compound ($SiO_x$: $0.5 \le x \le 1.6$). Then, the particles of silicon compound have, as chemical shift values obtained from $^{29}$Si-MAS-NMR, an intensity A of a peak derived from amorphous silicon obtained in −40 to −60 ppm, an intensity B of a peak derived from silicon dioxide obtained in the vicinity of −110 ppm, and an intensity C of a peak derived from Si obtained in the vicinity of −83 ppm, which satisfy the following formula 1 and formula 2.

$$B \le 1.5 \times A \quad (1)$$

$$B < C \quad (2)$$

Thus, when satisfying the formula (1), that is, when, in the particles of silicon compound, a silicon dioxide component is sufficiently small relative to an amorphous silicon component, a negative electrode active material having a high battery initial efficiency is formed since an irreversible component generated due to a reaction of a part of silicon dioxide with lithium during charge of a battery may be sufficiently reduced. Furthermore, when lithium is inserted in the particles of negative electrode active material, a part of the silicon dioxide reacts with lithium to form Si—Li. The Si—Li has high reactivity with water. However, in the negative electrode active material of the present disclosure, because a silicon dioxide component is small relative to an amorphous silicon component, the Si—Li may be suppressed from being generated, and stability of the negative electrode active material to an aqueous slurry during preparation of the electrode is improved. As a result thereof, the negative electrode active material having excellent cycle characteristics when a secondary battery is formed is obtained. In addition to this, when satisfying the formula 2, that is, when the silicon dioxide component is sufficiently small relative to the Si component, in the particles of silicon compound, in the same manner as the above, the negative electrode active material having higher battery initial efficiency is obtained.

By the way, a peak, derived from the amorphous silicon (a-Si) appears as a moderate peak in the region where a chemical shift value of a $^{29}$Si-MAS-NMR spectrum is −40 to −60 ppm as shown in FIG. 3 (reference diagram). Furthermore, also a peak obtained in the vicinity of −130 ppm is presumed derived from the amorphous silicon. Furthermore, a peak appears also in the vicinity of −83 ppm. The particles of negative electrode active material in the present, disclosure preferably have a peak in the vicinity of −130 ppm as the chemical shift value obtained from the $^{29}$Si-MAS-NMR spectrum. Since thing like this has a larger ratio of the amorphous silicon component, the initial efficiency and cycle characteristics may be more improved.

Furthermore, as shown in FIG. 3, there is a case where although in the region of from −40 to −60 ppm derived from the amorphous silicon, a clear moderate peak appears, but a maximal value is not shown. At this time, the peak intensity A is taken as a maximum value of the intensity of the spectrum in the range of from −40 to −60 ppm.

Furthermore, similarly, although there is a case where the peak in the vicinity of −110 ppm derived from silicon dioxide may not have the maximum value, in that case, the peak intensity 3 is set to the intensity at −110 ppm.

(Negative Electrode for Nonaqueous Electrolyte Secondary Battery)

First, a negative electrode for nonaqueous electrolyte secondary batteries will be described. FIG. 1 shows a cross-sectional configuration of a negative electrode for lithium ion secondary batteries (hereinafter, also referred to as "negative electrode") in one embodiment, of the present disclosure.

(Configuration of Negative Electrode)

As shown in FIG. 1, a negative electrode 10 is configured to have a negative electrode active material layer 12 on a negative electrode current collector 11. The negative electrode active material layer 12 may be formed on both surfaces or only on one surface of the negative electrode current collector 11. Furthermore, when a negative electrode active material of the present disclosure is used, the negative electrode current collector 11 may not be used.

(Negative Electrode Current Collector)

The negative, electrode current collector 11 is configured of a substance that is an excellent conductive material and has excellent mechanical strength. As the conductive materials that may be used for the negative electrode current collector 11, for example, copper (Cu) or nickel (Ni) may be used. The conductive material, is preferable not to form, an intermetallic compound with lithium (Li).

The negative electrode current collector 11 preferably contains carbon (C) or sulfur (S) other than a main element. This is because the physical strength of the current collector may be improved. In particular, in the case where an active material layer that expands during charge is included, when the current collector includes the elements, deformation of the electrode including the current collector may be suppressed. Although contents of the elements are not particularly limited, among these, each is preferably 70 mass ppm or less. This is because higher deformation suppression effect is obtained. Due to the deformation suppression effect like this, the cycle characteristics may be further improved.

Furthermore, a surface of the negative electrode current collector 11 may be roughened or may not be roughened. The roughened negative electrode current collector is a metal foil treated by, for example, an electrolytic treatment, an embossing treatment, or a chemical etching treatment. The negative electrode current collector that is not roughened is, for example, a roiled metal foil.

(Negative Electrode Active Material Layer)

The negative electrode active material layer 12 contains a negative electrode active material of the present disclosure capable of absorbing or releasing lithium ions, and, from the view point of battery design, may further contain other materials such as a negative electrode binder (binder) or a conductive assistant. The negative electrode active material contains particles of negative electrode active material, and the particles of negative electrode active material contain particles of a silicon compound containing a silicon compound (SiOx: $0.5 \leq x \leq 1.6$).

Furthermore, the negative electrode active material layer 12 may contain a mixed negative electrode active material that contains a negative electrode active material (silicon-based negative electrode active material) of the present disclosure and a carbon-based active material. Electric resistance of the negative electrode active material layer is lowered thereby, and the expansion stress accompanying the charge may be alleviated. Examples of the carbon-based active material include pyrolytic carbons, cokes, glass-like carbon fibers, organic polymer compound sinters, carbon blacks and the like.

Furthermore, the negative electrode of the present disclosure preferably has a rate of mass of the silicon-based negative electrode active material to a total amount of masses of the silicon-based negative electrode active material and the carbon-based active material of 6% by mass or more. When the rate of mass of the negative electrode active material of the present disclosure to a total amount of masses of the silicon-based negative electrode active material and the carbon-based active material is 6% by mass or more, battery capacity may be surely improved.

Furthermore, the negative electrode active material of the present disclosure such as described above contains particles of silicon compound, the particles of silicon compound are a silicon oxide material containing the silicon compound (SiO$_x$: $0.5 \leq x \leq 1.6$), the composition thereof preferably has x closer to 1. This is because high cycle characteristics may be obtained. By the way, the composition of the silicon compound in the present-disclosure does not necessarily mean a purity of 100%, and may contain a slight amount of impurities.

Furthermore, in the negative electrode active material of the present disclosure, the particles of silicon compound preferably contain at least one kind or more of $Li_2SiO_3$ and $Li_4SiO_4$. These are obtained by modifying a $SiO_2$ component part in the silicon compound, which becomes unstable during insertion and release of lithium during charge/discharge of a battery in advance to another lithium silicate, therefore irreversible capacity generated during charge may be reduced.

Furthermore, although the presence of at least one kind or more of $Li_2SiO_3$ and $Li_4SiO_4$ in the inside of a bulk of the particles of silicon compound may improve the battery characteristics, when the two kinds of Li compounds are coexisted, the battery characteristics are further improved. By the way, these lithium silicates may be quantified by NMR (Nuclear Magnetic Resonance) or XPS (X-ray photoelectron spectroscopy). Measurements of XPS and NMR are performed, for example, under the following conditions.

XPS

Device: X-ray photoelectron spectrometer,
X-ray source: monochromatic Al—K alpha line,
X-ray spot diameter: 100 μm,
Ar ion gun sputtering condition: 0.5 kV/2 mm×2 mm,
$^{29}$Si MAS NMR (magic angle rotation nuclear magnetic resonance)
Device: 700 NMR spectrometer produced by Bruker Inc.,
Probe: 4 mm HR-MAS Rotor 50 μL,
Sample revolving speed: 10 kHz, and
Measurement environment temperature: 25° C.

Furthermore, the particles of silicon compound preferably have a half-value width (2θ) of a diffraction peak due to a Si (111) crystal plane obtained by X-ray diffractometry of 1.2° or more and a crystallite size corresponding to the crystal plane of 7.5 nm or less. The lower the silicon crystallinity of the silicon compound in the particles of silicon compound is, the better, in particular, when an abundance of Si crystals is small, the battery characteristics may be improved, furthermore, a stable Li compound may be generated.

Furthermore, in the negative electrode active material of the present disclosure, the particles of negative electrode active material preferably contain a carbon material in a superficial layer part. When the particles of negative electrode active material contain the carbon material in the superficial part thereof, the electric conductivity may be improved. Therefore, when the negative electrode active material, containing the particles of negative electrode active material like this is used as the negative electrode active material of the secondary battery, the battery characteristics may be improved.

Furthermore, an average thickness of the carbon material of the superficial part of the particles of negative electrode active material is preferably 10 nm or more and 5000 nm or less. When the average thickness of the carbon material is 10 nm or more, the electric conductivity may be improved, and in the case where the average thickness of the carbon material to be coated is 5000 nm or less, when the negative electrode active material containing the particles of negative electrode active material like this is used as the negative electrode active material of the lithium ion secondary battery, the battery capacity may be suppressed from decreasing.

The average thickness of the carbon material may be calculated according to, for example, the following procedure. First, the particles of negative electrode active material are observed at an arbitrary magnification by TEM (transmission type electron microscope). The magnification that allows visual confirmation of a thickness of the carbon material such that the thickness may be measured is preferable. Subsequently, at optional 15 points, the thickness of the carbon material is measured. In this case, it is preferable to set measurement positions broadly and at random without concentrating on particular positions as much as possible. Last, an average value of the thicknesses of the carbon material at the 15 points is calculated.

Although a coverage of the carbon material is not particularly limited, the coverage is desirably as much as large. When the coverage is 30% or more, it is preferable because the electric conductivity is further improved. Although a covering method of the carbon material is not particularly limited, a sugar carbonization method and a pyrolysis method of hydrocarbon gas are preferred. It is because a coverage factor may be improved.

Furthermore, a median diameter ($D_{50}$: a particle size when a cumulative volume becomes 50%) of the particles of negative electrode active material is preferably 1.0 μm or more and 15 μm or less. This is because when the median diameter is within the above range, lithium ions are readily absorbed/released during charge/discharge and crack of the particles becomes difficult to occur. When the median diameter is 1.0 μm or more, a surface area a mass may be made small, and an increase in the battery irreversible capacity may be suppressed. On the other-hand, when the median diameter is set to 15 μm or less, a new surface is difficult to appear because the particles become difficult, to be cracked.

Furthermore, when a test cell formed of a negative electrode containing a mixture of the negative electrode active material and the carbon-based active material and a counter electrode lithium is prepared, and, in the test cell, when charge/discharge formed of charge that flows a current such that lithium is inserted in the silicon-based active material and discharge that flows a current such that the lithium is detached from the silicon-based active material is repeated 30 times, and a graph showing a relationship between a differential value dQ/dV obtained by differentiating a discharge capacity Q in each charge/discharge by a potential V of the negative electrode based on the counter electrode lithium and the potential V is depicted, the negative electrode active material (silicon-based, active material) of the present disclosure preferably has a peak in the range of 0.40 to 0.55 V of a potential V of the negative electrode during discharge at X times and after ($1 \leq X \leq 30$). The peak in a. V-dQ/dV curve is similar to the peak of the silicon material, since a discharge curve on a higher potential side rises up sharply, when designing a battery, capacity is readily developed. Furthermore, when the negative electrode active material develops the peak within 30 times of charge/discharge, it is judged that a stable bulk is formed.

Furthermore, as a negative electrode binder: contained in the negative electrode active material layer, at least any one kind or more of, for example, a polymer material, a synthetic rubber and so on may be used. Examples of the polymer materials include polyvinylidene fluoride, polyimide, polyamide-imide, aramid, polyacrylic acid, lithium polyacrylate, carboxymethylcellulose and the like. Examples of the synthetic rubbers include styrene-butadiene rubbers, fluororubbers, ethylene propylene diene and the like.

As the negative electrode conductive assistant, any one kind or more of carbon materials such as carbon black, acethylene black, graphite, Ketjen black, carbon nanotube, and carbon nanofiber may be used.

The negative electrode active material layer may be formed by, for example, a coating method. The coating method is a method in which after the particles of negative electrode active material and the binder, further, as needs arise, conductive assistant, and carbon material are mixed, followed by dispersing; in an organic solvent, water or the like, further followed by coating.

(Production Method of Negative Electrode)

The negative electrode may be formed according to, for example, the following procedure. First, a production method of a negative electrode active material used in the negative electrode will be described. In the beginning, particles of negative electrode active material containing particles of silicon compound containing a silicon compound ($SiO_x$: $0.5 \leq x \leq 1.6$) are prepared. Thereafter, from the particles of a negative electrode active material, particles of negative electrode active material in which, as a chemical shift value obtained from a $^{29}$Si-MAS-NMR spectrum, an intensity A of a peak derived from amorphous silicon obtained in −40 to −60 ppm, an intensity E of a peak derived from a silicon dioxide region obtained in the vicinity of −110 ppm, and an intensity C of a peak derived from Si obtained in the vicinity of −83 ppm satisfy the following formula 1 and formula 2 are selected. Then, with the selected particles of negative electrode active material, a negative electrode active material is produced.

$$B \leq 1.5 \times A \quad (1)$$

$$B < C \quad (2)$$

Furthermore, in order to prepare the particles of negative electrode active material, further, coating a carbon material on the particles of silicon compound may be provided. The particles of negative electrode active material on a surface of which the carbon material is coated have excellent electric conductivity.

Furthermore, modifying the particles of silicon compound by inserting lithium in the particles of silicon compound may be provided. By this step, by generating lithium silicate such as $Li_2SiO_3$ and $Li_4SiO_4$, for example, inside the bulk, the irreversible capacity generated during charge may be reduced.

In more detail, the negative electrode active material may be produced as shown below. At the beginning, a raw material that generates silicon oxide gas is heated under presence of inert gas, under reduced pressure, in the temperature range of from 900° C. to 1600° C. to generate silicon oxide gas. When considering a surface oxygen of metallic silicon powder and a slight amount of oxygen in a reaction furnace, a mixing molar ratio is desirably in the range of 0.8<metallic silicon powder/silicon dioxide powder<1.3.

Generated silicon oxide gas is solidified and deposited on an absorption plate. Then, with a temperature inside a reaction furnace lowered to 100° C. or less, the deposit of silicon oxide is taken out, followed by crushing, pulverizing with a ball mill, a jet mill or the like. As was described above, particles of silicon compound may be produced. By the way, Si crystallites in the particles of silicon compound may be controlled by change of vaporization temperature, or heat treatment after generation.

Here, a layer of the carbon material may be formed on a superficial layer of the particles of silicon compound. As a method of forming the layer of carbon material, a thermal decomposition CVD method is desirable. A method of generating the layer of carbon material by the thermal decomposition CVD method will be described.

First, the particles of silicon compound are set in a furnace. Next, hydrocarbon gas is introduced into the furnace, and an internal temperature of furnace is elevated. A decomposition temperature is not particularly limited, 1200° C. or less is desirable, and 950° C. or less is more desirable. When the decomposition temperature is set to 1200° C. or less, unintentional disproportionation of the particles of silicon compound may be suppressed. After elevating the internal temperature of furnace to a predetermined temperature, a carbon layer is generated on a surface of the particles of silicon compound. Thus, the particles of negative electrode active material may be produced. Furthermore, the hydrocarbon gas that, becomes a raw material of the carbon material is, though not particularly limited, desirable to be n≤3 in a $C_nH_m$ composition. In the case of n≤3, a production cost may be lowered, and, the physical properties of a decomposition product is made excellent.

Next, in the particles of negative electrode active material prepared as shown above, Li may be inserted to modify. At this time, it is preferable to make at least one kind or more of $Li_2SiO_2$ and $Li_4SiO_4$ contain in the particles of negative electrode active material. Li is preferably inserted by a redox method.

In modification due to the redox method, for example, first, by soaking the particles of negative electrode active material in a solution A in which lithium is dissolved in an ether solvent, the lithium may be inserted. In the solution A, a polycyclic aromatic compound or a straight chain polyphenylene compound may be further-contained. After insertion of Li, when the particles of negative electrode active material are soaked in a solution B containing a polycyclic aromatic compound or a derivative thereof, active lithium may be detached from the particles of negative electrode active material. Examples of solvents of the solution B include ether-based solvents, ketone-based solvents, ester-based solvents, alcohol-based solvents, amine-based solvents, or mixed solvents thereof. Furthermore, after soaking in the solution B, when the particles of negative electrode active material are soaked, in a solution C containing the alcohol-based solvent, a carboxylic acid-based solvent, water, or mixed solvent thereof, more abundant, active lithium may be detached from the particles of negative electrode active material. Furthermore, in place of the solution C, a solution. C that contains a compound having a quinoid structure in a molecule as a solute, and contains the ether-based solvent, the ketone-based solvent, the ester-based solvent, or mixed solvent, thereof as the solvent may be used. Furthermore, soaking of the particles of negative electrode active material in the solutions B, C and C' may be repeated. Thus, when the active lithium is detached after insertion of lithium, Si—Li in the particles of silicon compound may be reduced, and the negative electrode active material having higher water resistance is formed. After that, a method of cleaning with alcohol, alkali water in which lithium carbonate is dissolved, weak acid, or pure water may be applied. Still furthermore, lithium silicate generated on the particles of negative electrode active material according to the present method is amorphous.

Next, from the particles of negative electrode active material after modification, particles in which, as a chemical shift value obtained, from, a $^{29}$Si-MAS-NMR spectrum, an intensity A of a peak derived from amorphous silicon obtained in −40 to −60 ppm, an intensity B of a peak derived a silicon, dioxide region obtained in the vicinity of −110 ppm, and an intensity C of a peak derived from Si obtained in the vicinity of −83 ppm satisfy the following formula 1 and formula 2 are selected.

$$B \leq 1.5 \times A \quad (1)$$

$$B < C \quad (2)$$

The $^{29}$Si-MAS-NMR may be carried out under conditions shown below.
29Si MAS NMR
Device; 700 NMR Spectrometer produced by Bruker Inc.,
Probe: 4 mm HR-MAS Rotor 50 µL,
Sample revolving speed: 10 kHz, and
Measurement environment temperature: 25° C.

An intensity of a peak is expressed by a height, of a peak from a base line calculated from a 29 Si-MAS-NMR spectrum. At this time, the base line may be determined according to a normal method.

By the way, the selection of the particles of negative electrode active material is not necessarily performed every time of production of the negative electrode active material, that is, when selecting by finding production conditions satisfying the formula 1 and formula 2, after that, the negative electrode active material may be produced under the same conditions as the selected conditions.

After mixing the negative electrode active material prepared as shown above with other materials such as a negative electrode binder and a conductive assistant to form, a negative electrode mixture, an organic solvent or water is added to form a slurry. Next, on a surface of the negative electrode current collector, the slurry is coated, dried to generate a negative electrode active material layer. At this time, as needs arise, hot press or the like may be applied. Furthermore, when the negative electrode current collector contains carbon and sulfur each at 70 ppm or less, an effect of suppressing deformation of the negative electrode may be obtained. Thus, the negative electrode may be prepared.
(Lithium Ion Secondary Battery)

Next, a lithium ion secondary battery of the present disclosure will be described. The lithium ion secondary battery of the present disclosure uses a negative electrode that contains the negative electrode active material of the present disclosure. Here, as a specific example, a laminate film type lithium ion secondary battery is cited as an example,
(Configuration of Laminate Film Type Secondary Battery)

A laminate film type lithium ion secondary battery 20 shown in FIG. 2 houses a wound electrode body 21 mainly inside a sheet-like exterior member 25. The wound body has a separator between a positive electrode and a negative electrode and is formed by winding. Further, there is a case where the positive electrode and the negative electrode have a separator therebetween and house a laminate body. In either of electrode bodies, a positive electrode lead 22 is attached to the positive electrode, and a negative electrode lead 23 is attached to the negative electrode. An outermost periphery part of the electrode body is protected by a protective tape.

The positive and negative electrode leads are led in one direction, for example, from the inside of the exterior member 25 toward an outside thereof. The positive electrode lead 22 is made of a conductive material such as aluminum or the like, and the negative electrode lead 23 is made of a conductive material such as nickel, copper or the like.

The exterior member 25 is a laminate film in which, for example, a fusion layer, a metal layer, and a surface protective layer are laminated in this order, and, in the laminate film, outer peripheral parts in the fusion layer of two sheets of film are fused with each other or are adhered with an adhesive such that fusion layers may face with an electrode body 21. The fusion part is a film such as polyethylene, polypropylene or the like, and the metal part is an aluminum foil or the like. The protective layer is, for example, nylon or the like.

An adhesive film 24 is inserted between the exterior member 25 and the positive and negative electrode leads to prevent outer air from intruding. The material is, for example, a polyethylene, polypropylene, or polyolefin resin.

(Positive Electrode)

The positive electrode has a positive electrode active material layer on both sides or on one side of a positive electrode current collector in the same manner as in the negative electrode 10 of, for example. FIG. 1.

The positive electrode current collector is made of a conductive material such as aluminum or the like.

A positive electrode active material layer contains any one or more kinds of positive electrode materials capable of absorbing/releasing lithium ions, and, may contain other materials such as a binder, a conductive assistant, a dispersant and the like depending on a design. In this case, details of the binder and the conductive assistant are the same as the negative electrode binder and the negative electrode conductive assistant described above.

As the positive electrode material, a Li-containing compound is desirable. As the Li-containing compound, a composite oxide made of, for example, lithium and a transition metal element, or a phosphate compound having the Li and the transition metal element may be used. Among these positive electrode materials, compounds containing at least one or more kinds of nickel, iron, manganese, and cobalt are preferred. Chemical formulas for these are represented by, for example, $Li_xM1O_2$ or $Li_yM2PO_4$. In the formulas, M1 and M2 represent at least one or more kinds of the transition metal elements. Values of x and v show different values depending on a battery charge/discharge state, but, are generally shown by $0.05 \le x \le 1.10$ and $0.05 \le y \le 1.10$.

As the composite oxide containing the lithium and the transition metal element, for example, a lithium-cobalt composite oxide ($Li_xCoO_2$), a lithium-nickel composite oxide ($Li_xNiO_2$) may be used. As the phosphate compound having the lithium and the transition metal element, for example, a lithium-iron phosphate compound ($LiFePO_4$) or a lithium-iron-manganese phosphate compound ($LiFe_{1-u}Mn_uPO_4$ ($0<u<1$)) may be used. When these positive electrode materials are used, high battery capacity may be obtained and excellent cycle characteristics may be also obtained.

(Negative Electrode)

A negative electrode has the same configuration as the negative electrode for lithium ion secondary batteries 10 of the FIG. 1, and has a negative electrode active material layer 12, for example, on both sides of the current collector 11. The negative electrode preferably has a negative electrode charge capacity larger than an electric capacity (charge capacity as a battery) obtained from a positive electrode active material agent. This is because the precipitation of the lithium metal on the negative electrode may be suppressed.

The positive electrode active material layer is provided on a part of both sides of the positive electrode current collector, and the negative electrode active material layer is also provided on a part of both sides of the negative electrode current collector. In this case, the negative electrode active material layer provided on, for example, the negative electrode current collector is provided on a region where an opposing positive electrode active material layer is not present. This is because stable battery design is carried out.

A non-facing region, that is, a region where the negative electrode active material layer and the positive electrode active material layer do not face is hardly influenced by the charge/discharge. Therefore, a state of the negative electrode active material layer is maintained just as immediately after the formation. Thereby, a composition of the negative electrode active material or the like may be accurately investigated, with excellent reproducibility irrespective of the presence or non-presence of the charge/discharge.

(Separator)

The separator separates the positive electrode and the negative electrode and allows passage of lithium ions while preventing current short-circuit accompanying the contact of both electrodes from occurring. The separator is formed of a porous film made of, for example, a synthetic resin, or ceramic, and may have a laminate structure in which two or more kinds of porous films are laminated. Examples of the synthetic resin include polytetrafluoroethylene, polypropylene, and polyethylene.

(Electrolytic Solution)

At least a part of the active material layer or the separator is impregnated with a liquid electrolyte (electrolytic solution). The electrolytic solution has an electrolyte salt dissolved in the solvent and may contain other materials such as an additive or the like.

As the solvent, for example, a nonaqueous solvent may be used. Examples of the nonaqueous solvents include ethylene carbonate, propylene carbonate, butylene carbonate, dimethyl carbonate, diethyl carbonate, ethyl methyl carbonate, methyl propyl carbonate, 1,2-dimethoxy ethane, tetrahydrofuran and the like. Among these, it is desirable to use at least one or more kinds of ethylene carbonate, propylene carbonate, dimethyl carbonate, diethyl carbonate, and ethyl methyl carbonate. This is because more excellent characteristics may be obtained. Furthermore, in this case, more advantageous characteristics may be obtained by combining a high viscosity solvent such as ethylene carbonate, propylene carbonate or the like and a low viscosity solvent such as dimethyl carbonate, ethyl methyl carbonate, diethyl carbonate or the like. This is because dissociability or ionic mobility of the electrolyte salt is improved.

When an alloy-based negative electrode is used, it is desirable to contain, in particular as a solvent, at least one kind of a halogenated linear carbonic ester or a halogenated cyclic carbonic ester. Thus, during charge/discharge, in particular during charge, a stable film is formed on a surface of the negative electrode active material. Here, the halogenated linear carbonic ester is a linear carbonic ester having a halogen as a constituent element (at least one hydrogen is substituted with a halogen). Furthermore, the halogenated cyclic carbonic ester is a cyclic carbonic acid ester having a halogen as a constituent element (that is, at least one hydrogen is substituted with a halogen).

Although a kind of the halogen is not particularly limited, fluorine is preferable. This is because a higher-quality film than other halogens may be formed. Furthermore, the larger the number of halogens is, the more desirable. This is because an obtained film, is more stable, and a decomposition reaction of the electrolytic solution is reduced.

Examples of halogenated linear carbonic esters include carbonic acid fluoromethylmethyl ester and carbonic acid difluoromethylmethyl. Examples of the halogenated cyclic carbonic esters include 4-fluoro-1,3-dioxolane-2-on, 4,5-difluoro-1,3-dioxolane-2-on and the like.

It is preferable to contain an unsaturated carbon bond cyclic carbonic, ester as a solvent additive. This is because a stable film is formed on a surface of the negative electrode during charge/discharge to be able to suppress a decomposition reaction of the electrolytic solution. Examples of the unsaturated carbon bond cyclic carbonic ester include, for example, vinylene carbonate and vinyl ethylene carbonate.

Furthermore, it is preferable to contain a sultone (cyclic sulfonic acid ester) as the solvent additive. This is because the chemical stability of the battery is improved. Examples of the sultone include propane sultone and propene sultone.

Furthermore, the solvent preferably contains an acid anhydride. This is because the chemical stability of the electrolytic solution is improved. As the acid anhydride, for example, propane disulfonic acid anhydride may be used.

The electrolyte salt may contain any one or more kinds of light metal salts such as lithium salts or the like. As the lithium salt, for example, lithium hexafluorophosphate ($LiPF_6$), lithium tetrafluoroborate ($LiBF_4$) or the like may be used.

A content of the electrolyte salt is preferably 0.5 mol/kg or more and 2.5 mol/kg or less relative to the solvent. This is because high ionic conductivity is obtained.

(Production Method of Laminate Film Type Secondary Battery)

In the present disclosure, a negative electrode is prepared with the negative electrode active material produced according to a production method of the negative electrode active material of the present disclosure, and with the prepared negative electrode, a lithium ion secondary battery is produced.

At the beginning, a positive electrode is prepared with the above positive electrode material. First, a positive electrode mixture is formed by mixing the positive electrode active material and, as needs arise, a binder and a conductive assistant, followed by dispersing in an organic solvent to form a positive electrode mixture slurry. Subsequently, the mixture slurry is coated on the positive electrode current collector by a coating device such as a knife roll or a die coater with a die head and dried with hot air to obtain a positive electrode active material layer. At the end, the positive electrode active material layer is compression molded by a roll press machine or the like. At this time, heating may be applied, or, heating or compression may be repeated a plurality of times.

Next, by using the same operation procedure as in the preparation of the negative electrode for lithium ion secondary batteries 10, the negative electrode active material layer is formed on the negative electrode current collector to form a negative electrode.

When preparing the positive electrode and the negative electrode, the respective active material layer is formed on both sides of the positive electrode and the negative electrode current collectors. At this time, in any of the electrodes, active material coating lengths on the both surface parts may be displaced (see FIG. 1).

Subsequently, an electrolytic solution is prepared. Further subsequently, by using ultrasonic welding or the like, the positive electrode lead 22 is attached, to the positive electrode current collector as shown in FIG. 2, and, the negative electrode lead 23 is attached to the negative electrode current collector. Then, the positive electrode and the negative electrode are laminated via a separator, or are wound to prepare a wound electrode body 21, followed by adhering a protective tape to the outermost peripheral part thereof. Next, the wound electrode body is molded, into a flat shape. Then, after inserting the wound electrode body between folded film-like exterior member 25, insulation parts of the exterior member are adhered by a thermal fusion method with each other, and with only one direction opened, the wound electrode body is encapsulated. Then, an adhesive film is inserted between the positive electrode lead, and the negative electrode lead and the exterior member. A predetermined amount, of the above prepared electrolytic solution is charged from a releasing part, followed by vacuum impregnation. After the impregnation, the releasing part is adhered by a vacuum thermal fusion method. As was described above, the laminate film type lithium ion secondary battery 20 may be produced.

EXAMPLE

In what follows, the present disclosure will be more specifically described with reference to Examples and Comparative Examples of the present disclosure. However, the present disclosure is not limited to these examples.

Example 1-1

According to the following procedure, a laminate film type lithium secondary battery 20 shown in FIG. 2 was prepared.

First, a positive electrode was prepared. A positive electrode active material was prepared as a positive electrode mixture by mixing 95% by mass of $LiNi_{0.7}Co_{0.25}Al_{0.05}O$ that is lithium-nickel-cobalt composite oxide (NCA), 2.5% by mass of a positive electrode conductive assistant, and 2.5% by mass of a positive electrode binder (polyvinylidene fluoride: PVDF). Subsequently, the positive electrode mixture was dispersed in an organic solvent (N-methyl-2-pyllolydone: NMP) to render a paste-like slurry. Subsequently, the slurry was coated on both sides of the positive electrode current collector with a coating machine having a die head, followed by drying with a hot air type dryer. At this time, the positive electrode current collector having a thickness of 15 μm was used. At the end, a roll press was used to perform compression molding.

Next, a negative electrode was prepared. A negative electrode active material was prepared in the following manner. A raw material in which metallic silicon and silicon dioxide are mixed was introduced in a reaction furnace, what was vaporized in an atmosphere having at degree of vacuum, of 10 Pa was deposited on an absorption plate, after sufficiently cooling, a deposit was taken out and pulverized by a ball mill. A value of x of $SiO_x$ of particles of silicon compound obtained like this was 1.0. Then, a particle size of the particles of the silicon compound was adjusted by classification. Thereafter, a carbon film was coated on a surface of the particles of silicon compound by performing thermal CVD. This was taken as the particles of negative electrode active material.

Subsequently, lithium was inserted into the particles of negative electrode active material by a redox method to modify. First, the particles of negative electrode active material were soaked in a solution (solution $A_1$) in which a lithium piece and biphenyl were dissolved in tetrahydrofuran (hereinafter, referred to also as THF). A solution $A_1$ of Example 1-1 was prepared by dissolving biphenyl in the THF solvent at the concentration of 1 mol/L, followed by adding the piece of lithium of a mass portion of 10% by mass relative to a mixed liquid of the THF and biphenyl. Furthermore, a temperature of the solution when soaking the particles of negative electrode active material was set to 20° C., and a soaking time was set to 48 hours. After that, the particles of negative electrode active material were filtered. According to the above treatment, the lithium was inserted into the particles of negative electrode active material.

Next, in a solution (solution B) in which naphthalene was dissolved in THF, the particles of negative electrode active material after lithium insertion was soaked. The solution B of Example 1-1 was prepared by dissolving naphthalene in the THF solvent at the concentration of 2 mol/L. Furthermore, a temperature of the solution when the particles of negative electrode active material are soaked was set to 20° C., and the soaking time was set to 30 hours. After that, the particles of negative electrode active material were filtered.

Then, the particles of negative electrode active material after contact with the solution B were soaked in a solution (solution C) in which p-benzoquinone was dissolved in THF at the concentration of 1 mol/L. The soaking time was set to 10 hours. After that, the particles of negative electrode active material were filtered.

Next, the particles of negative electrode active material were cleansed, and the cleansed particles of negative electrode active material were dried under reduced pressure.

Here, when the particles of negative electrode active material prepared according to Example 1-1 were measured by $^{29}$Si-MAS-NMR, a spectrum like FIG. 4 was obtained. When peak intensities were calculated by setting a base line in the spectra of FIG. 4, an intensity A of a peak derived from, amorphous silicon of which chemical shift, value is obtained in −40 to −60 ppm, an intensity B of a peak derived from a silicon dioxide region of which chemical shift value is obtained in the vicinity of −110 ppm, and an intensity C of a peak derived from Si of which chemical shift value is obtained in the vicinity of −83 ppm satisfied the following formula 1 and formula 2.

$$B \leq 1.5 \times A \quad (1)$$

$$B < C \quad (2)$$

Furthermore, a peak was obtained also at a position where the chemical shift, value is in the vicinity of −130 ppm. The peak is assumed also a peak derived from amorphous silicon.

A negative electrode active material was prepared by blending the particles of negative electrode active material prepared as shown above and a carbon-based active material at a mass ratio of 1:9. Here, as the carbon-based active material, natural graphite coated with a pitch layer and artificial graphite were mixed at a mass ratio of 5:5 and used. Furthermore, a median diameter of the carbon-based active material was 20 μm.

Next, the prepared particles of negative electrode active material, a conductive assistant 1 (carbon nanotubes, CNT), a conductive assistant 2 (carbon fine particles having a median diameter of about 50 nm), a styrene-butadiene rubber (styrene-butadiene copolymer, hereinafter, referred, to as SBR), and carboxymethylcellulose (hereinafter, referred to as CMC) were mixed, at a dry mass ratio of 92.5:1:1:2.5:3, followed by diluting with pure water to prepare a negative electrode mixture slurry. By the way, the SBR and CMC are negative electrode binders.

Furthermore, as the negative electrode current, collector, an electrolytic copper foil having a thickness of 15 μm was used. The electrolytic copper foil contained carbon and sulfur each at a concentration of 70 mass ppm. At the end, the negative electrode mixture slurry was coated on the negative electrode current, collector, followed by drying at 100° C.×1 hour in a vacuum atmosphere. After drying, a deposit, amount of the negative electrode active material layer a unit area in one surface of the negative electrode (called also as area density) was 5 mg/cm$^2$.

Next, after solvents (4-fluoro-1,3-dioxolan-2-on (FEC), ethylene carbonate (EC) and dimethyl carbonate (DMC)) were mixed, an electrolyte salt (lithium hexafluorophosphate: LiPF$_6$) was dissolved to prepare an electrolytic solution. In this case, a composition of the solvent was set to FEC:EC:DMC=10:20:70 by volume ratio, and a content of the electrolytic salt was set to 1.2 mol/kg relative to the solvent.

Next, a secondary battery was assembled as shown below. At the beginning, an aluminum lead was ultrasonically welded to one end of the positive electrode current collector, and a nickel lead was welded to one end of the negative electrode current collector. Subsequently, the positive electrode, the separator, the negative electrode, and the separator were laminated in this order, and wound in the longitudinal direction to obtain a wound electrode body. A winding end part thereof was fixed with a PET protective tape. As the separator, a laminate film (thickness: 12 μm) in which a film having a porous polyethylene as a main component is sandwiched by a film having a porous polypropylene as a main component was used. Subsequently, after sandwiching the electrode body between the exterior members, outer periphery parts excluding one side were sealed each other by thermal fusion and the electrode body was housed inside thereof. As the exterior member, an aluminum laminated film in which a nylon film, an aluminum foil, and a polypropylene film, are laminated was used. Subsequently, the prepared electrolytic solution was charged from an opening part and impregnated under a vacuum atmosphere, followed, by the thermal fusion to seal.

The cycle characteristics and first time charge/discharge characteristics of the secondary battery prepared as shown above were evaluated.

The cycle characteristics were investigated as shown below. At the beginning, two cycles of charge/discharge were carried, out at 0.2 C under the atmosphere of 25° C. for stabilizing the battery, and a discharge capacity at the second cycle was measured. Subsequently, the charge/discharge was performed until a total number of cycles becomes 499 cycles, and the discharge capacity was measured at each cycle. At the end, a capacity retention rate (hereinafter, referred to also simply as retention rate) was calculated by dividing the discharge capacity at the 500$^{th}$ cycles obtained under 0.2 C charge/discharge by the discharge capacity at the 2$^{nd}$ cycle. For normal cycles, that is, from 3$^{rd}$ cycle to 499$^{th}$ cycle, the charge/discharge was carried out at 0.7 C charge and 0.5 C discharge.

When investigating the first time charge/discharge characteristics, a first time efficiency (hereinafter, in some cases, referred, to as initial efficiency) was calculated. The first time efficiency was calculated from a formula expressed by first time efficiency (%)=(first time discharge capacity/first time charge capacity)×100. The atmosphere and temperature were set to the same as in the case where the cycle characteristics were investigated.

Furthermore, from the negative electrode prepared as was described above and a counter electrode lithium, a coin battery type test cell of a 2032 size was prepared, and a discharge behavior thereof was evaluated. In more specifically, first, at the counter electrode Li, a constant current and a constant voltage charge was performed up to 0 V, and, at the time point where the current density reached 0.05 mA/cm$^2$, the charge was stopped. After that, constant current discharge was performed up to 1.2 V. The current density at this time was 0.2 mA/cm$^2$. The charge/discharge was repeated 30 times, from the data obtained in each charge/discharge, a graph was depicted with a capacity variation rate (dQ/dV) on a vertical axis and a voltage (V) on a horizontal axis, and whether the V may obtain a peak in the range of from 0.4 to 0.55 (V) was confirmed. As a result thereof, in charge/discharge within 30 times, a peak was obtained in the range of from 0.4 to 0.55 (V) of the V, and, in all charge/discharges until the 30$^{th}$ time of the charge/discharge from the charge/discharge where this peak appeared for the first time, this peak was obtained.

Furthermore, the first time efficiency of the silicon-based active material alone (SiO$_x$ alone) was calculated as shown below. First, the above-prepared particles of negative electrode active material and polyacrylic acid were mixed at a mass ratio of 85:15, and the mixture was coated on a copper foil. An area density of the mixture coated at this time was about 2 mg/cm$^2$. Thereafter, after vacuum drying at 90° C. for 1 hour, in a coin battery shape of 2032 size, with a counter electrode Li, a constant current and constant voltage charge was started at a voltage of 0 and a current density of 0.2 mA/cm$^2$. Then, at the time point where the current value became 0.1 mA, the constant current and constant voltage charge was stopped. Subsequently, a constant current discharge, was performed, and at the time point where the voltage reached 1.2 V, the discharge was stopped. The current, density during the discharge was set to the same as in the charge. At this time, when the condition under which Li is input into the negative electrode is taken as the charge, and the condition under which the Li is taken out is taken as the discharge, the first time efficiency of the silicon-based active material alone (SiO$_x$ alone) becomes (discharge capacity)/(charge capacity)×100(%). By using the formula, the first time efficiency of the SiO$_x$ alone was calculated. As a result thereof, the first time efficiency of the SiO$_x$ alone was 85.4%.

Comparative Example 1-1

A secondary battery was prepared in the same manner as in Example 1-1 except that, as shown in FIG. 4, particles of negative electrode active material in which peak intensities A, B, C in $^{29}$Si-MAS-NMR spectra do not satisfy the formula 1 and formula 2 were used. As obvious from FIG. 4, a spectrum in which the intensity B of a peak derived from, a silicon dioxide region in which a chemical shift value is obtained in the vicinity of −110 ppm is the largest is obtained. By the way, whether a chemical shift value of the $^{29}$Si-MAS-NMR spectrum has a peak in the vicinity of −130 ppm could not be determined. In Comparative Example 1-1, the particles of negative electrode active material prepared in the same procedure as in Example 1-1 except that the modification of Example 1-1 was not applied, were used.

Furthermore, from the same negative electrode as in the secondary battery prepared in Comparative Example 1-1 and the counter electrode lithium, a test cell of a 2032 size coin battery type was prepared, and its discharge behavior was evaluated, in the same manner as in Example 1-1. As a result thereof, in the charge/discharge within 30 times, a peak, was obtained in the range of from 0.4 to 0.55 (V). Furthermore, when the first time efficiency of the SiO$_x$ alone was calculated of the particles to which the modification was not applied in the same manner as in Example 1-1, the first time efficiency of the SiO$_x$ alone was 71%.

Comparative Example 1-2

A secondary battery was produced in the same manner as in Example 1-1, except that, as shown in FIG. 4, particles of negative electrode active material in which peak intensities A, B, C in the $^{29}$Si-MAS-NMR spectra do not satisfy the formula 1 were used. By the way, a chemical shift value of the $^{29}$Si-MAS-NMR spectrum developed a peak in the vicinity of −130 ppm.

In Comparative Example 1-2, the particles of negative electrode active material prepared in the same procedure as in Example 1-1 except that a soaking time in each solution of the particles of negative electrode active material during modification due to the redox reaction was halved to that of Example 1-1 were used. In the redox reaction, by adjusting the soaking time into the solution or the stirring condition, an insertion depth of Li into the particles of the negative electrode active material may be adjusted. Thus, the peak intensities A, B and C may be adjusted. In Example 1-1, the Li was inserted, to the depth deeper than that of Comparative Example 1-2.

Furthermore, from the same negative electrode as in the secondary battery prepared, in Comparative Example 1-2 and the counter electrode lithium, a test cell of a 2032 size coin battery type was prepared, and its discharge behavior was evaluated in the same manner as in Example 1-1. As a result thereof, in the charge/discharge within 30 times, a peak was obtained in the range of 0.4 to 0.55 (V), Furthermore, when the first time efficiency of the SiO$_x$ alone was calculated in the same manner as in Example 1-1 of the particles, the first time efficiency of the SiO$_x$ alone was 80.1%.

At this time, the particles of negative electrode active materials of Example 1-1 and Comparative Examples 1-1 and 1-2 had the property such as shown below. The median diameter D$_{50}$ of the particles of negative electrode active material was 4.0 μm. Furthermore, the silicon compound had the half value width (2θ) of a diffraction peak derived from a Si (111) crystal plane obtained by X-ray diffractometry of 2.593°, and crystallite size derived from the Si (111) crystal plane was 3.29 nm. Furthermore, an average thickness of the carbon material on a surface of the particles of negative electrode active material was 100 nm.

In Table 1, results of Example 1-1 and Comparative Examples 1-1 and 1-2 are shown.

TABLE 1

SiO$_x$ = x = 1 D$_{50}$ = 4 μm, copper foil: carbon 70 ppm, sulfur 70 ppm, SiO$_x$ ratio 10% by mass, positive electrode NCA, average thickness of carbon material 100 nm, Si(111) half value width 2.593° crystallite 3.29 nm, with dQ/dV peak

| Table 1 | Formula 1 | Formula 2 | Presence of -130 ppm peak | Retention Rate (%) | Initial Efficiency (%) |
|---|---|---|---|---|---|
| Comparative Example 1-1 | Not satisfy | Not satisfy | Impossible to discriminate | 75.0 | 84.0 |
| Comparative Example 1-2 | Not satisfy | Satisfy | Present | 77.0 | 86.5 |
| Example 1-1 | Satisfy | Satisfy | Present | 82.0 | 89.1 |

As obvious from Table 1, in Example 1-1 that, satisfies both of formula 1 and formula 2, the initial efficiency was improved than in Comparative Examples 1-1 and 1-2. Furthermore, regarding the cycle characteristics, in Example 1-1, since, due to an improvement in the negative electrode efficiency, a negative electrode end potential becomes lower to shift in the direction in which a silicate decomposition region is difficult to use, the cycle retention rate is also improved. In particular, when combining a positive electrode that uses the NCA and the negative electrode of the present disclosure, an improvement effect of the battery characteristics may be effectively exhibited. Furthermore, the positive electrode that uses the NCA has the initial, efficiency of about 89% in the actual battery service range and has the similar efficiency as the negative electrode prepared in Example 1-1. Therefore, the positive electrode side may be safely used.

Examples 2-1 and 2-2, Comparative Examples 2-1 and 2-2

A secondary battery was produced in the same manner as in Example 1-1 except that an oxygen amount inside bulk of the silicon compound was adjusted. In this case, by changing a ratio of metallic silicon and silicon dioxide in a raw material of the silicon compound or a heating temperature, an oxygen amount was adjusted. Values of x of the silicon compound expressed by $SiO_x$ in Examples 2-1 and 2-2 and Comparative Example 2-1 and 2-2 were shown in Table 2.

TABLE 2

$SiO_x$ $D_{50}$ = 4 μm, copper foil: carbon 70 ppm, sulfur 70 ppm, $SiO_x$ ratio 10% by mass, positive electrode NCA, average thickness of carbon material 100 nm, Si(111) half value width 2.593° crystallite 3.29 nm, formulas 1 and 2 are satisfied, with −130 ppm peak

| Table 2 | x | Presence of dQ/dV peak | Retention Rate (%) | Initial Efficiency (%) |
|---|---|---|---|---|
| Example 1-1 | 1 | Yes | 82.0 | 89.1 |
| Comparative Example 2-1 | 0.3 | No | 69.0 | 91.0 |
| Example 2-1 | 0.5 | No | 78.5 | 90.0 |
| Example 2-2 | 1.5 | Yes | 80.0 | 89.0 |
| Comparative Example 2-2 | 1.8 | Yes | — | — |

As shown in Table 2, in the silicon compound expressed by $SiO_x$, when a value of x is in the range of $0.5 \leq x \leq 1.6$, the battery characteristics were more improved. When oxygen is not sufficient like in Comparative Example 2-1 (x=0.3), the initial efficiency is improved but the capacity retention rate is remarkably degraded. On the other hand, when the oxygen amount is excessive (x=1.8) as shown in Comparative Example 2-2, due to an excessive oxygen amount, absorption/release of lithium is difficult to occur, and capacity of the silicon compound is not substantially developed, therefore the evaluation was stopped.

Examples 3-1 to 3-4, Comparative Examples 3-1 and 3-2

Each of secondary batteries was produced under the same conditions as in Example 1-1 except that the crystallinity of particles of silicon compounds was varied as shown in Table 3, and the cycle characteristics and the first time efficiency were evaluated. By the way, the crystallinity in the particles of silicon compound may be controlled by change of a vaporization temperature of the raw material, or, heat treatment after generation of the particles of silicon compound. Furthermore, when the crystallinity of the particles of silicon compound is high like in Comparative Examples 3-1 and 3-2, since a value of the peak intensity A derived from amorphous silicon becomes smaller than the peak intensity B of silicon dioxide, the formula 1 was not satisfied.

TABLE 3

$SiO_x$ x = 1 $D_{50}$ = 4 μm, copper foil: carbon 70 ppm, sulfur 70 ppm, $SiO_x$ ratio 10% by mass, positive electrode NCA, average thickness of carbon material 100 nm, with dQ/dV peak, formula 2 is satisfied, with −130 ppm peak

| Table 3 | Formula 1 | Half value width (°) | Crystallite size (nm) | Retention rate (%) | Initial efficiency (%) |
|---|---|---|---|---|---|
| Example 3-1 | Satisfy | 10.123 | 1.524 | 82.5 | 89.0 |
| Example 1-1 | Satisfy | 2.593 | 3.29 | 82.0 | 89.1 |
| Example 3-2 | Satisfy | 1.845 | 4.62 | 81.5 | 89.0 |
| Example 3-3 | Satisfy | 1.755 | 4.86 | 81.0 | 89.0 |
| Example 3-4 | Satisfy | 1.218 | 7.21 | 80.0 | 89.1 |
| Comparative Example 3-1 | Not satisfy | 1.025 | 8.55 | 76.0 | 89.2 |
| Comparative Example 3-2 | Not satisfy | 0.796 | 10.84 | 75.0 | 89.3 |

In response to the crystallinity of the particles of silicon compound, the capacity retention rate and first time efficiency varied. In particular, a high capacity retention rate was obtained by a low crystallinity material in which the half value width is 1.2° or more and the crystallite size derived from the Si (111) plane is 7.5 nm or less.

Examples 4-1 to 4-5

Each of secondary batteries was prepared under the same conditions as in Example 1-1 except that median diameter of the particles of negative electrode active material were varied as shown in Table 4, followed by evaluating the cycle characteristics and the first time efficiency.

TABLE 4

$SiO_x$ x = 1, copper foil: carbon 70 ppm, sulfur 70 ppm, $SiO_x$ ratio 10% by mass, positive electrode NCA, average thickness of carbon material 100 nm, with dQ/dV peak, with −130 ppm peak, formula 1 and formula 2 are satisfied, Si(111) half value width 2.593° crystallite 3.29 nm

| Table 4 | Median diameter (μm) | Retention rate (%) | Initial efficiency (%) |
|---|---|---|---|
| Example 1-1 | 4 | 82.0 | 89.1 |
| Example 4-1 | 0.5 | 78.0 | 88.5 |
| Example 4-2 | 1 | 81.5 | 88.7 |
| Example 4-3 | 10 | 81.0 | 89.2 |
| Example 4-4 | 15 | 80.0 | 89.3 |
| Example 4-5 | 20 | 78.0 | 88.8 |

When the median diameter of the silicon compound is 0.5 μm or more, the retention rate was improved. This is considered because a surface area a unit mass of the silicon compound is not so large, an area where a side reaction occurs is reduced thereby, and consumption of the electrolytic solution was suppressed. On the other hand, when the median diameter is 15 μm or less, since the particles are difficult to be cracked during charge and an SEI (solid-electrolyte interface) due to a newly formed surface during charge/discharge is difficult, to be generated, the loss of reversible Li may be suppressed. Furthermore, when the median diameter of the particles of silicon-based active material is 15 μm or less, since an expansion amount of the particles of silicon compound does not become large during the charge, physical, electrical breakdown of the negative electrode active material layer due to expansion may be prevented.

Example 5-1

A secondary battery was prepared under the same condition as in Example 1-1 except that a carbon material was not coated on a surface of the particles of silicon compound, followed by evaluating the cycle characteristics and the first time efficiency.

Examples 5-2 to 5-6

Each of secondary batteries was prepared under the same conditions as in Example 1-1 except that an average thickness of the carbon material coated on a surface of the particles of silicon compound was varied, followed by evaluating the cycle characteristics and the first, time efficiency. An average thickness of the carbon material may be adjusted by changing the CVD conditions.

TABLE 5

$SiO_x$ x = 1, $D_{50}$ = 4 μm, copper foil: carbon 70 ppm, sulfur 70 ppm, $SiO_x$ ratio 10% by mass, positive electrode NCA, with dQ/dV peak, with −130 ppm peak, formula 1 and formula 2 are satisfied, Si(111) half value width 2.593° crystallite 3.29 nm

| Table 5 | Average thickness (nm) | Retention rate (%) | Initial efficiency (%) |
|---|---|---|---|
| Example 1-1 | 100 | 82.0 | 89.1 |
| Example 5-1 | 0 | 79.0 | 88.0 |
| Example 5-2 | 5 | 82.0 | 89.0 |
| Example 5-3 | 10 | 82.2 | 89.1 |
| Example 5-4 | 500 | 82.5 | 89.0 |
| Example 5-5 | 1000 | 82.6 | 89.0 |
| Example 5-6 | 5000 | 82.5 | 88.5 |

As obvious from Table 5, the retention rate and the initial efficiency may be improved since the electric conductivity is particularly improved when the average thickness of the carbon material is 10 nm or more. On the other hand, when the average thickness of the carbon material is 5000 nm, or less, the battery capacity is not degraded, since an amount of the particles of silicon compound may be sufficiently secured from the viewpoint of battery design.

Example 6-1

A secondary battery was prepared, under the same condition as in Example 1-1 except, that a copper foil that does not contain carbon and sulfur was used as a current collector of the negative electrode, followed by evaluating the cycle characteristics and the first time efficiency.

TABLE 6

$SiO_x$ x = 1, $D_{50}$ = 4 μm, $SiO_x$ ratio 10% by mass, positive electrode NCA, average thickness of carbon material 100 nm, with dQ/dV peak, with −130 ppm peak, formula 1 and formula 2 are satisfied, Si(111) half value width 2.593° crystallite 3.29 nm

| Table 6 | Carbon and sulfur in copper foil | Retention rate (%) | Initial efficiency (%) |
|---|---|---|---|
| Example 1-1 | Yes | 82.0 | 89.1 |
| Example 6-1 | No | 80.0 | 89.0 |

When the current collector of the negative electrode contains each of carbon and sulfur at 70 mass ppm or less, the strength of the current collector is improved. Therefore, when the particles of silicon-based negative electrode active material having large expansion, contraction during the charge/discharge of the secondary battery are used, deformation and strain of the current collector accompanying this may be suppressed, as in Example 1-1, the batter characteristics, in particular, the cycle characteristics are improved.

Example 7-1

A secondary battery was prepared under the same condition as in Example 1-1 except that a ratio of mass of the particles of negative electrode active material (particles of silicon-based active material) in the negative electrode active material was changed, followed by evaluating the cycle characteristics and the first time efficiency.

Comparative Example 7-1

A secondary battery was prepared under the same condition as in Comparative Example 1-1 except that a ratio of mass of the particles of negative electrode active material (particles of silicon-based active material) in the negative electrode active material was changed, followed by evaluating an increase rate of the battery capacity.

In FIG. 5, a graph that expresses a relationship between a ratio of the particles of the silicon-based active material to a total amount of the negative electrode active material in each of Example 7-1 and Comparative Example 7-1 and an increase rate of the battery capacity of the secondary battery is shown. As obvious from FIG. 5, when a rate of the silicon-based compound becomes 6% by mass or more in Example 7-1, the increase rate of the battery capacity becomes larger than in Comparative Example 7-1, and a volume energy density particularly remarkably increases.

By the way, it is to be noted that the present invention is not limited to the foregoing embodiment. The embodiment is just an exemplification, and any of examples that have substantially the same feature and demonstrate the same functions and effects as those in the technical concept described in claims of the present invention are included in the technical scope of the present invention.

The invention claimed is:
1. A negative electrode active material before being assembled into a battery, comprising:
particles of the negative electrode active material, wherein the particles of the negative electrode active material contain particles of a silicon compound containing a silicon compound $SiO_x$:0.5≤x≤1.6, wherein the particles of the negative electrode active material contain at least one kind or more of $Li_2SiO_3$ and $Li_4SiO_4$, wherein the particles of the silicon compound have, as chemical shift values obtained from a $^{29}$Si-MAS-NMR spectrum, an intensity A of a peak derived from amorphous silicon obtained in a vicinity of −40 to −60 ppm, an intensity B of a peak derived from silicon dioxide obtained in a vicinity of −110 ppm, and an intensity C of a peak derived from Si obtained in a vicinity of −83 ppm, which satisfy the following formula 1 and formula 2:

$$B \leq 1.5 \times A \tag{1}$$

$$B < C \tag{2}$$

wherein the particles of silicon compound further have, as a chemical shift value obtained from the $^{29}$Si-MAS-NMR spectrum, an intensity peak derived from amorphous silicon in a vicinity of −130 ppm, wherein the particles of the silicon compound have a half value width (2θ) of a diffraction peak derived from a Si(111) crystal plane obtained by X-ray diffractometry of 1.20 or more and a crystallite size corresponding to the Si(111) crystal plane of 7.5 nm or less, and wherein the at least one kind or more of $Li_2SiO_3$ and $Li_4SiO_4$ contained in the particles of the negative electrode active material is formed by Li insertion of a redox method.

2. The negative electrode active material according to claim 1, wherein a test cell formed of a negative electrode containing a mixture of the negative electrode active material and a carbon-based active material and a counter electrode lithium is prepared, in the test cell, charge/discharge formed of charge during which a current is flowed so as to insert lithium into the negative electrode active material and discharge during which the current is flowed so as to detach lithium from the negative electrode active material is carried out 30 times, and when a graph showing a relationship between a differential value dQ/dV obtained by differentiating a discharge capacity Q by a potential V of the negative electrode based on the counter electrode lithium and the potential V is depicted in each charge/discharge, the potential V of the negative electrode during discharges on or after X times (1≤X≤30) has a peak in the range of from 0.40 V to 0.55 V.

3. The negative electrode active material according to claim 1, wherein the particles of the negative electrode active material have a median diameter of 1.0 μm or more and 15 μm or less.

4. The negative electrode active material according to claim 1, wherein a carbon material is on a superficial layer of the negative electrode active material.

5. The negative electrode active material according to claim 4, wherein an average thickness of the carbon material is 10 nm or more and 5000 nm or less.

6. A mixed negative electrode active material comprises the negative electrode active material according to claim 1 and a carbon-based active material.

7. A negative electrode for nonaqueous electrolyte secondary batteries comprising:
the mixed negative electrode active material according to claim 6,
wherein a ratio of a mass of the negative electrode active material relative to a total mass of the negative electrode active material and the carbon-based active material is 6% by mass or more.

8. A negative electrode for nonaqueous electrolyte secondary batteries comprising:
a negative electrode active material layer formed with the mixed negative electrode active material according to claim 6; and
a negative electrode current collector,
wherein the negative electrode active material layer is formed on the negative electrode current collector; and
the negative electrode current collector includes carbon and sulfur, and each of contents thereof is 70 mass ppm or less.

9. A lithium ion secondary battery comprising:
a negative electrode containing the negative electrode active material according to claim 1.

10. A method of producing a negative electrode active material according to claim 1, the method comprising:
preparing particles of negative electrode active material containing particles of silicon compound containing a silicon compound ($SiO_x$:0.5≤x≤1.6); and
selecting, from the particles of negative electrode active material, particles of negative electrode active material in which, as chemical shift values obtained from a $^{29}$Si-MAS-NMR spectrum, an intensity A of a peak derived from amorphous silicon obtained in a vicinity of −40 to −60 ppm, an intensity B of a peak derived from silicon dioxide obtained in a vicinity of −110 ppm, and an intensity C of a peak derived from Si obtained in a vicinity of −83 ppm, which satisfy the following formula 1 and formula 2:

$$B \leq 1.5 \times A \tag{1}$$

$$B < C \tag{2}$$

wherein producing the negative electrode active material with the selected particles of negative electrode active material.

11. A production method of a lithium ion secondary battery comprising:
preparing a negative electrode using the negative electrode active material produced according to the production method of the negative electrode active material according to claim 10; and
producing a lithium ion secondary battery with the prepared negative electrode.

* * * * *